United States Patent Office 3,450,672
Patented June 17, 1969

3,450,672
ORGANOSILSESQUIOXANES AND A METHOD FOR MAKING THEM
Duane F. Merrill, Ballston Spa, N.Y., assignor to General Electric Company, a corporation of New York
No Drawing. Filed Jan. 12, 1967, Ser. No. 608,760
Int. Cl. C08g *31/16*
U.S. Cl. 260—46.5                                    10 Claims

ABSTRACT OF THE DISCLOSURE

A method, and organosilsesquioxanes comprising chemically combined $CH_3SiO_{1.5}$ units produced by such method, in the form of solventless, friable, thermoplastic moldable materials, which are stable at 25° C. and melt at temperatures above 80° C., and are convertible to the infusible state at temperatures above 150° C.

---

The present invention relates to certain solventless, moldable organosilsesquioxanes and a method for making them.

Prior to the present invention, organopolysiloxane resins having a ratio of less than about 1.3 monovalent organo radicals per silicon atom, attached to silicon by carbon-silicon linkages, were generally unstable materials unless they were stored at temperatures below 0° C., or as an organic solvent solution.

One method which can be employed to improve the stability of such materials to provide for the production of solventless, thermoplastic organopolysiloxane resins is shown in Hyde et al. Patent 2,482,276. Hyde et al. teach that solventless resins having improved stability can be achieved by treating the resins with alkali metal hydroxides. A completely condensed solvent-free resin is provided as a result of condensing hydroxyl radicals attached to silicon. Although the solventless silanol-free resins produced by Hyde et al.'s method are stable at 25° C. for an indefinite period of time, the softening point of these thermoplastic resins are extremely high, such as 250° C. As a result these materials are unsuitable in transfer molding applications which require friable materials at 25° C. having a melting point between 60° C. to 120° C. An additional reason why the thermoplastic products of Hyde et al. are unsuitable for transfer molding materials are that they have a high weight loss at elevated temperatures due to the presence of residual condensation catalyst resulting in dimensional stability problems.

In order to satisfy the needs of molding fabricators who can not employ conventional organopolysiloxane molding resins dissolved in an organic solvent, a method was developed whereby the resin is deposited on a finely divided inert carrier such as glass fibers or sand. A slurry of the carrier and the organic solvent solution of the molding resin is blown with hot air into a silo effecting the separation of the solvent from the resin while forming a stable coating of the resin on the finely divided carrier. The resulting granular product can be blended with catalyst and directly molded to a finished part utilizing heat and pressure. Although the silo method eliminates the problem of disposing of the organic solvent, it results in other serious limitations. For example, the fabricator has to be satisfied with the type of carrier furnished by the manufacturer of the resin which serves as a reinforcing material. A further limitation is that it is difficult to make a resin-filler mixture having a predetermined weight ratio of resin to filler since the resin is introduced into the mixture as a coating on the filler, rather than a material which can be directly blended with the filler.

The present invention is based on the discovery that solventless resins in the form of friable organopolysilsesquioxanes comprising at least 75 mole percent of chemically combined $CH_3SiO_{0.5}$ units, can be made by a method which provides for a product having superior heat stability, a flow temperature at low as 80° C., and a fusion temperature of about 200° C. The organosilsesquioxanes made in accordance with the practice of the invention also can be advantageously blended directly with various fillers at any desired weight ratios.

The solventless organosilsesquioxanes of the present invention can be made by a method which comprises (1) effecting the hydrolysis of organoalkoxysilane by adding water to a mixture while it is agitated comprising a solution of said organoalkoxysilane in a water immiscible organic solvent, where the water is added in an amount sufficient to provide for at least 1.5 moles of water, per mole of said organoalkoxysilane while utilizing a sufficient amount of a cosolvent for water and said water immiscible organic solvent to produce a substantially homogeneous hydrolysis mixture, (2) agitating the resulting substantially homogeneous hydrolysis mixture of (1) with an additional amount of water which is sufficient to produce a substantially heterogeneous wash mixture having an organic phase and an aqueous phase, (3) recovering the organic phase from the wash mixture of (2) and (4) stripping the organic phase of (3) of volatiles at pressures up to atmospheric and at temperatures up to 175° C., where said organoalkoxysilane is selected from (A) a mixture consisting essentially of a major amount of methyldialkoxyhalosilane and a minor amount of methyltrialkoxysilane,
(B) a mixture comprising at least 75 mole percent of (A), and up to 25 mole percent of phenyltrihalosilane, based on the total moles of (A) and phenyltrihalosilane,
(C) the product produced by agitating a mixture of from about 2 to about 2.6 moles of aliphatic monohydric alcohol, per mole of methylhalosilane in a mixture selected from
  (a) methylhalosilane consisting essentially of methyltrihalosilane, and
  (b) a mixture of (a), and up to 25 mole percent of phenyltrihalosilane, based on the total moles of (A) and phenyltrihalosilane.

The organoalkoxysilane which can be utilized in the practice of the invention can be made by partially alkoxylating organohalosilane of the formula, (1)     $RSiX_3$ where R is selected from a methyl radical and a mixture of methyl and phenyl radicals where the ratio of methyl to phenyl has a value of at least about 3, and X is a halogen radical, for example, chloro, bromo, etc. There can be employed aliphatic alcohols of the formula, (2)     $R'OH$ where R' is an alkyl radical having from 1 to 8 carbon atoms. The alkoxylation can be achieved by effecting reaction between about 2 to 2.6 moles of aliphatic alcohol of Formula 2, per mole of methylhalosilane included by Formula 1 at temperatures between 0° C. to 100° C. in accordance with standard alkoxylation procedures. Alternatively, the organoalkoxysilane can be made by mixing together a major amount of methyldialkoxyhalosilane of the formula, (3)     $CH_3Si(OR')_2X$ with a minor amount of methyltrialkoxysilane of the formula, (4)     $RSi(OR')_3$ and optionally mixing the resulting mixture with sufficient phenyltrihalosilane to provide for a mixture of methylalkoxysilane of Formulae 3 and 4 having up to 25 mole percent of phenyltrihalosilane based on the total moles of methylalkoxysilane and phenyltrihalosilane.

Included by the organohalosilanes of Formula 1 are for example, methyltrichlorosilane and methylchlorosilane mixtures of methyltrichlorosilane and up to 5 mole percent of such methylchlorosilane mixtures of dimethyldichlorosilane. In addition, organohalosilane of Formula 1 includes mixtures of methyltrichlorosilane and phenyltrichlorosilane containing up to 25 mole percent of phenyltrichlorosilane and also including up to 5 mole percent of dimethyldichlorosilane.

Aliphatic alcohols which are included by Formula 2 are for example, methanol, ethanol, propanol, isopropanol, butanol, pentanol, hexanol, octanol, etc. Organodialkoxylhalosilanes of Formula 3 are for example, methyldimethoxychlorosilane, methyldiisopropoxychlorosilane, methyldibutoxybromosilane, and mixtures of any one of the aforementioned methylalkoxyhalosilanes. Organotrialkoxysilanes of Formula 3 are for example, methyltrimethoxysilane, methyltriisopropoxysilane, etc., and mixtures of such methyltrimethoxysilanes.

The organosilsesquioxanes of the present invention can be more particularly described as solventless, friable, thermoplastic organosilsesquioxanes, which are stable at 25° C. for an indefinite period of time and convertible to the infusible state at temperatures exceeding 200° C., comprising at least 75 mole percent of chemically combined $CH_3SiO_{1.5}$ units and having the average formula, (5) 

$$(CH_3)_a(C_6H_5)_bSi(OR')_c(OH)_dO_{(4-a-b-c-d)/2}$$

where $a$ has a value of from 0.75 to 1.05, inclusive, $b$ has a value of from 0 to 0.25, inclusive, and the sum of $a+b$ has a value of from 0.9 to 1.05, inclusive, $c$ has a value of from 0.02 to 0.08, inclusive, $d$ has a value of from 0.005 to 0.06, inclusive, and $R'$ is an alkyl radical as previously defined. Radicals included by $R'$ of Formula 5 are for example, methyl, ethyl, propyl, isopropyl, isobutyl, amyl, hexyl, etc.

When made in accordance with the practice of the invention, the solventless organosilsesquioxanes are friable, thermoplastic solids which can be readily granulated and utilized in the finely divided state. It has been found that when stored as granules having an average particle size capable of passing a #4 Tyler mesh screen, the organosilsesquioxanes will remain stable at 25° C. for an indefinite period of time, such as a year or more. Experience has shown that when stored as pieces having an average cross-section exceeding ¼", the organosilsesquioxanes are preferably maintained at a temperature of about 0° C. or below, to avoid surface gelation. It has been found that the organosilsesquioxanes of the present invention gradually soften at about 50° C., and readily convert to the liquid state at a temperature above 80° C. At temperatures exceeding 200° C., the organosilsesquioxanes of the present invention can be converted to the solid infusible state within 30 minutes or less. The organosilsesquioxanes have a molecular weight in the range of between about 1000 to 3500 and are preferably composed of up to 100 mole percent of chemically combined methylsiloxy units. However, amounts of phenylsiloxy units up to 25 mole percent based on the total moles of siloxy units in the organosilsesquioxane can be advantageously employed. The organosilsesquioxanes of the present invention contain from about 0.5 percent to about 13 percent by weight of chemically combined alkoxy radicals such as isopropoxy radicals, and from 0.1 percent by weight, and up to and not exceeding 1.5 percent by weight of hydroxy radicals attached to silicon, based on the total weight of organosilsesquioxane. It has been found that if the weight percent of chemically combined alkoxy radicals attached to silicon exceeds the aforedescribed limits, the material becomes less friable, tacky, and undesirable as a molding resin. In instances where the alkoxy level is too low, the organosilsesquioxane cannot be readily converted from a friable solid to a liquid, and to the infusible state.

The organosilsesquioxanes of the present invention can be employed as binding materials for making ceramic molds, can be utilized in transfer molding operations, and can be employed as laminating resins. The organosilsesquioxanes can be readily granulated and blended with various catalysts such as ethylenediamine, dibutyltindi-2-ethylhexanoic, cholinebicarbonate, zinc acetate, etc., which can facilitate the cure of the resin to the infusible state. It has been found that a curing catalyst is not necessary if temperatures of at least 200° C. are utilized over periods averaging from 20 to 40 minutes.

In the practice of the invention, hydrolysis of the organoalkoxysilane is initially effected by the addition of water to a highly agitated solution of the organoalkoxysilane in an organic solvent. A cosolvent for the water and organic solvent also is employed during the hydrolysis in an amount sufficient to maintain the resulting hydrolysis mixture in substantially one phase.

Preferably, the method of the invention is practiced by initially alkoxylating the organohalosilane prior to hydrolysis by employing an aliphatic alcohol as shown by Formula 2, and organohalosilane of Formula 1. Although the order of addition is not critical, it is preferred to add the alcohol to the organohalosilane while agitating the mixture. A temperature between 0° C. to 40° C. can be employed during the alkoxylation while hydrogen halide is allowed to continuously evolve.

Hydrolysis of the organoalkoxysilane is effected by adding water to a highly agitated solution of the organoalkoxysilane in a suitable organic solvent, while utilizing a cosolvent for water and the organic solvent to produce and maintain a substantially homogeneous hydrolysis mixture. Suitable organic solvents are for example, any organic solvents which are inert to the reactants during the hydrolysis and include for example, benzene, toluene, xylene, mineral spirits, N-butylacetate, etc.

During the hydrolysis, there can be utilized from 1.5 moles to about 3 moles of water, per mole of organoalkoxysilane, while higher amounts of water can be tolerated depending upon the manner and rate of addition, without adverse results. A cosolvent for water and the organic solvent is employed in amounts to provide for a substantially homogeneous hydrolysis mixture. Suitable cosolvents include for example, acetone, dioxane, tetrahydrofuran, Cellosolve, etc.

To provide for effective results during the hydrolysis step, there can be employed from about 0.8 part to 1.2 parts of organic solvent, per part of organoalkoxysilane. The cosolvent is preferably added along with the water to an organic solvent solution of the organoalkoxysilane. Temperatures during the hydrolysis can be maintained at 50° C. to 70° C., and preferably 20° C. to 40° C.

At the termination of the hydrolysis of the organoalkoxysilane, which can be effected within thirty minutes or less, or several hours depending upon the degree of agitation, additional water is added to remove excess hydrolysis acid from the hydrolysis mixture. The amount of water utilized is not critical but it should be at least sufficient to produce a heterogeneous wash mixture. Removal of excess hydrolysis acid can be achieved by allowing the hydrolysis mixture to settle and separating the aqueous phase from the solution of the organosilsesquioxane hydrolyzate in the organic solvent phase.

Prior to stripping the organic phase of solvent to provide for the recovery of the organosilsesquioxane hydrolyzate, it is preferred to effect the removal of solid matter, such as foreign matter, gel particles, etc. from the organic solvent phase. Clean up of the organic phase can be achieved by standard means such as filtration, centrifuging, etc. Prior to the removal of foreign matter, it has been found expedient to initially strip the organic solvent phase of excess water, hydrogen halide and organic solvent to produce an organic solvent concentrate. Further stripping can be effected at temperatures above 50° C., at below atmospheric pressure, and gradually raised to temperatures between 100° C. to 175° C. while maintaining below atmospheric pressures such as 25 mm. or above, until the organosilsesquioxane hydrolyzate is free of organic solvent. The organosilsesquioxane then can be poured for casting into a sheet or flaked on a cold roll. When it has cooled to room temperature, the resin can be ground to a desirable particle size such as an average size of about 10 mesh. If desired it can be stored in a porous container such as cardboard and refrigerated.

In order that those skilled in the art will be better able to practice the invention, the following examples are given by way of illustration and not by way of limitation. All parts are by weight.

EXAMPLE 1

There was added 6.69 moles of methyltrichlorosilane to 15.7 moles of isopropyl alcohol. During the addition, the alcohol was continuously agitated, and the temperature of the alkoxylation mixture was maintained at a temperature below 40° C. The addition of the methyltrichlorosilane was complete after about 1 hour. The mixture was then heated to 100° C. to remove excess hydrochloric acid. The resulting mixture was then analyzed with a vapor phase chromatograph and it was found to contain about 58 percent by weight of methyldiisopropoxychlorosilane, 38 percent by weight of methyltriisopropoxysilane, and about 4 percent by weight of higher molecular weight materials.

About 1900 parts of the above silane mixture was then mixed with 1045 parts of toluene. While the resulting toluene solution of the methylisopropoxysilane was rapidly stirred, there was added 400 parts of an acetone-water solution which provided for about a 10 percent by weight excess of water over the stoichiometric equivalent required to completely hydrolyze the methylisopropoxysilane in the mixture. During the addition of the aqueous-acetone mixture, the resulting hydrolysis mixture was maintained in substantially one phase and at a temperature below 40° C. The addition lasted about 40 minutes and the resulting hydrolysis mixture was further agitated for an additional 30 minutes.

While the above hydrolysis mixture was stirred rapidly, there was added 166 parts of water over a period of about 15 minutes. The mixture was then allowed to settle and the acid layer was separated. The resulting methylsilsesquioxane hydrolyzate was then concentrated to 100 percent solids by distillation to 150° C., at pressures of about 25 mm. Liquid resin was then poured from the vessel and cast to a thin layer. Upon cooling the resin became dry and friable. A Zerewitinoff determination utilizing methylmagnesiumiodide in accordance with the method of F. Gunther, Anal. Chem., vol. 30, p. 1118 (1958), showed that the product contained about 0.5 percent by weight of hydroxy radicals. Nuclear magnetic resonance indicated that the resin had about 4 percent by weight of chemically combined isopropoxy radicals. A vapor phase osmometer showed that the resin had a molecular weight of about 2500. Based on the aforementioned results and method of preparation, the resin was a methylsilsesquioxane having the average formula,

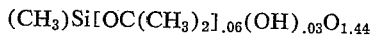
(CH$_3$)Si[OC(CH$_3$)$_2$]$_{.06}$(OH)$_{.03}$O$_{1.44}$

The above resin was granulated to a powder which readily passed through a #10 Tyler mesh screen. A portion of the granular resin was stored under atmospheric conditions at a temperature of 25° C. for about a year. It was then placed on a hot plate and softened at a temperature of about 60° C. It flowed at a temperature of about 100° C. and was converted to the infusible state at a temperature of about 200° C. within 30 minutes. The powdered resin was found to be useful as a binder in precision ceramic molding applications. In addition, it was found useful as a transfer molding resin when blended with 25 percent by weight of the resin of a finely divided silica filler, in combination with 0.5 percent by weight of lead acetate as a curing catalyst based on the weight of the blend.

EXAMPLE 2

There was added 592 parts of an aqueous solution of acetone to an organic solvent solution of silanes consisting of 846 parts of the methylisopropoxysilane mixture prepared in accordance with Example 1, 847 parts of phenyltrichlorosilane and 1570 parts of toluene, while the resulting hydrolysis mixture was vigorously stirred. The amount of water utilized was equivalent to about a 10% by weight excess over the stoichiometric amount needed to completely hydrolyze the total silane. The rate of addition of the aqueous acetone solution was controlled so that the hydrolysis mixture was maintained at a temperature below 40° C. The addition was completed after 40 minutes, and the mixture was then stirred for an additional 30 minutes to insure complete hydrolysis. There was then added to the resulting mixture, 1300 parts of water and the resulting two phase mixture was stirred for about 15 minutes. After the organic layer had been sufficiently washed, the mixture was allowed to settle and the acid layer was drawn off. The organic layer was then stripped under reduced pressure to a temperature of 50° C. until there was obtained a toluene solution having about 60% by weight solution of organosilsesquioxane hydrolyzate. The solution was then filtered to remove all solid matter. The filtrate was then stripped to 150° C. utilizing a pressure of about 25 mm. until a solvent-free product was obtained. It was cast into a thin layer. Upon cooling, the resin became dry and friable. It was ground to a powder having an average particle size which passed a #4 mesh screen. The Zerewitinoff method was employed to determine the silanol content of the product in accordance with the procedure of Example 1. It was found to have 0.1% by weight of OH attached to silicon. A vapor phase osmometer indicated that the product had a molecular weight of about 3000. Nuclear magnetic resonance showed that the product had 4 percent by weight of isopropoxy radicals. Based on the aforementioned results, the product had the average formula,

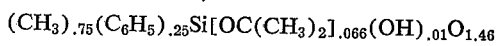
(CH$_3$)$_{.75}$(C$_6$H$_5$)$_{.25}$Si[OC(CH$_3$)$_2$]$_{.066}$(OH)$_{.01}$O$_{1.46}$ The powder softened at approximately 120° C. and it flowed at about 130° C. It fused at a temperature of about 200° C. after it had been stored under atmospheric conditions for about a year.

EXAMPLE 3

There is added an aqueous solution of 1,4-dioxane to a xylene solution of methylmethoxysilane while it is vigorously stirred consisting of about 1000 parts of xylene and 2000 parts of a mixture of methyldimethoxychlorosilane and methyltrimethoxysilane in which the ratio of the dimethoxysilane to the trimethoxysilane has a value of about 2. The amount of water utilized is equivalent to about a 10% stoichiometric excess of that required to completely hydrolyze the methylmethoxy silanes. The addition lasts for about 15 minutes during which time the temperature is maintained at below about 40° C. The mixture is then stirred for an additional 30 minutes. There is then added to the resulting mixture 2000 parts of water which results in the production of an aqueous phase and an organic phase. After agitating the wash mixture for 15 minutes, it is allowed to settle and the acid layer is drawn off. The organic layer is then stripped under reduced pressure to a temperature to 150° C. The resulting liquid methylsilsesquioxane hydrolyzate is stripped free of solvent. A thin sheet of resin is cast from the stripped liquid product. Upon cooling it becomes dry and friable. It is ground into a fine powder. Infrared analysis of the product showed it is substantially identical to the product obtained in Example 1 except for the presence of methoxy radicals in place of isopropoxy. Based on its method of preparation, and its analyses, the product is a methylsilsesquioxane having the formula, $$(CH_3)Si(OCH_3)_{.06}(OH)_{.03}O_{1.44}$$

EXAMPLE 4

A copolymeric siloxane composed of 25 mole percent of phenylsiloxy units chemically combined with about 75 mole percent of methylsiloxy units was made as follows in accordance with the teaching of Hyde et al. Patent 2,482,276.

A mixture of 75 mole percent of methyltrichlorosilane and 25 mole percent of phenyltrichlorosilane was added over a 20 minute period to a mixture of diethylether and water while it was vigorously stirred. The resulting mixture contained equal parts by weight of diethylether and chlorosilane, and sufficient water to provide for a 10% stoichiometric excess over that required to completely hydrolyze the chlorosilane. Following the addition, a further amount of water was added to the hydrolysis mixture which was to equal the weight of the diethylether in the mixture. Washing of the hydrolyzate was accomplished by agitating the mixture over a 10 minute period. The hydrolyzate was then allowed to settle and then separated from the acid layer.

A toluene solution containing 11½% by weight of the above-prepared phenylmethylsiloxane hydrolyzate was made following the teaching of Example 1 of the above Hyde et al. patent. A solution of 2.064 parts of a 50% aqueous potassium hydroxide was then added to the solution to provide for a potassium to silicon atomic ratio of 1 to 100. The organosiloxane solution was heated to reflux. Water was removed from the mixture along with alcohol. Toluene was then stripped from the mixture until there was obtained a solution having a concentration of 18.1% by weight of organosiloxane. The mixture was refluxed until the viscosity of the solution became constant. In accordance with the teaching of Example 1, there was obtained a hard, brittle solid having a melting point of about 250° C.

Methyltrichlorosilane was hydrolyzed by the above procedure to provide for a methylpolysiloxane. It also was a hard, brittle solid melting at a temperature above 200° C.

In order to measure the stability of the organosilsesquioxanes made by the method of Hyde et al. as compared to the resins made in accordance with the practice of the present invention, the above-described methylphenylsilsesquioxane silicone resin was compared to the methylsilsesquioxane and methylphenylsilsesquioxane made in accordance with the practice of the present invention utilizing a thermogravimetric analyzer. A one gram sample of each of the resins was heated at a temperature between 25° C. to 900° C. over a period of about 6 hours in which the temperature rose at a rate of about 150° per hour. Initial weight of the sample was compared to the final weight of the sample to determine the percent volatiles lost during the heating period. The results obtained are shown below where methyl is the methylsilsesquioxane containing up to 100 mole percent methylsiloxy units, methylphenyl is the methylphenylsilsesquioxane composed of 25 mole percent of phenylsiloxy units and about 75 mole percent of methylsiloxy units, and "Merrill" is the product shown in Examples 1 and 2 of the subject specification. Percent weight loss is the final weight of the sample after the 6 hour heating period to 900° C. divided by the initial weight of the sample prior to heating×100.

| Hyde et al.: | Percent weight loss |
|---|---|
| Methylphenyl | 24.7 |
| Merrill: | |
| Methyl | 17 |
| Methylphenyl | 15.7 |

As shown by the above results, those skilled in the art know that the organosilsesquioxanes made in accordance with the practice of the present invention containing a minor amount of hydroxy radicals attached to silicon provide for organopolysiloxane resins showing improved heat stability at elevated temperatures, as compared to the silanol-free organosilsesquioxane resins made by the method of Hyde et al. containing residual amounts of condensation catalyst. The organosilsesquioxanes of the present invention would therefore provide for superior molding resins and binders for ceramic applications requiring materials exhibiting a low degree of weight loss at elevated temperatures in applications requiring dimensional integrity.

What I claim as new and desire to secure by Letters Patent of the United States is:

1. A method which comprises (1) effecting the hydrolysis of organoalkoxysilane by adding water to a mixture while it is agitated comprising a solution of said organoalkoxysilane in a water immiscible organic solvent, where the water is added in an amount sufficient to provide for at least 1.5 moles of water, per mole of said organoalkoxysilane, while utilizing a sufficient amount of a cosolvent for water and said organic solvent to produce a substantially homogeneous hydrolysis mixture, (2) agitating the substantially homogeneous hydrolysis mixture of (1) with an additional amount of water which is sufficient to produce a substantially heterogeneous wash mixture having an organic phase and an aqueous phase, (3) recovering the organic phase from the wash mixture of (2) and (4) stripping the organic phase (3) of volatiles at pressures up to atmospheric and at temperatures up to 175° C., where said organoalkoxysilane is selected from the class consisting of
 (A) a mixture consisting essentially of a major amount of methyldialkoxyhalosilane and a minor amount of methyltrialkoxysilane,
 (B) a mixture comprising at least 75 mole percent of (A), and up to 25 mole percent of phenyltrihalosilane, based on the total moles of (A) and phenyltrihalosilane,
 (C) the product produced by agitating a mixture of from about 2 to about 2.6 moles of aliphatic monohydric alcohol, per mole of methylhalosilane in a mixture selected from the class consisting of
  (a) methylhalosilane consisting essentially of methyltrihalosilane, and
  (b) a mixture of (a), and up to 25 mole percent of phenyltrihalosilane, based on the total moles of (A) and phenyltrihalosilane.

2. A method in accordance with claim 1, where the organoalkoxysilane is the product produced by agitating a mixture of from about 2 to about 2.6 moles of aliphatic monohydric alcohol, per mole of a methylhalosilane mixture consisting essentially of methyltrihalosilane.

3. A method in accordance with claim 1, where the organoalkoxysilane is the product produced by agitating a mixture of from about 2 to about 2.6 moles of aliphatic monohydric alcohol, per mole of methylhalosilane in a halosilane mixture consisting essentially of methyltrihalosilane and up to 25 mole percent of total halosilane of phenyltrihalosilane.

4. A method in accordance with claim 1, where the cosolvent is acetone.

5. A method in accordance with claim 1, where the aliphatic alcohol is isopropanol.

6. A method in accordance with claim 1, where the organic solvent is toluene.

7. A solventless, friable organosilsesquioxane comprising at least 75 mole percent of chemically combined $CH_3SiO_{1.5}$ units, which is stable for an indefinite period of time at 25° C., flows at a temperature above 80° C. and converts to the infusible state at temperatures above 150° C. where the organo radicals of the organosilsesquioxane are attached to silicon by carbon-silicon linkages and are selected from the class consisting of methyl radicals and a mixture of methyl radicals and phenyl radicals.

8. An organosilsesquioxane in accordance with claim 7, having the formula $$(CH_3)_a(C_6H_5)_bSi(OR')_c(OH)_dO_{(4-a-b-c-d)/2}$$

where R' is an alkyl radical having from 1 to 8 carbon atoms, $a$ has a value of from 0.75 to 1.05, inclusive, $b$ has a value of from 0 to 0.25, inclusive, and the sum of $a+b$ has a value of from 0.9 to 1.05, inclusive, $c$ has a value of from 0.02 to 0.08, inclusive, and $d$ has a value of from 0.005 to 0.06, inclusive.

9. An organosilsesquioxane in accordance with claim 7, having the average formula, $$(CH_3)Si[OC(CH_3)_2]_{.06}(OH)_{.03}O_{1.44}$$

10. An organosilsesquioxane in accordance with claim 7, having the average formula, $$(CH_3)_{.75}(C_6H_5)_{.25}Si[OC(CH_3)_2]_{.06}(OH)_{.01}O_{1.44}$$

References Cited

UNITED STATES PATENTS

| | | | |
|---|---|---|---|
| 2,556,897 | 6/1951 | Bidaud | 260—448.2 |
| 3,208,972 | 9/1965 | Lyons | 260—46.5 |
| 3,274,288 | 9/1966 | Harris et al. | 260—825 |
| 3,367,910 | 2/1968 | Newing | 260—46.5 |
| 3,234,179 | 2/1966 | Katchman et al. | 260—46.5 |

DONALD E. CZAJA, *Primary Examiner.*

M. T. MARQUIS, *Assistant Examiner.*

U.S. Cl. X.R.

260—37, 448.2